(12) United States Patent
Yamazaki et al.

(10) Patent No.: US 11,869,244 B2
(45) Date of Patent: Jan. 9, 2024

(54) NOTIFICATION DEVICE, NOTIFICATION METHOD, AND NOTIFICATION STORAGE MEDIUM

(71) Applicant: NEC Corporation, Tokyo (JP)

(72) Inventors: Daiki Yamazaki, Tokyo (JP); Ryuji Wakakusa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/788,785

(22) PCT Filed: Dec. 27, 2019

(86) PCT No.: PCT/JP2019/051452
§ 371 (c)(1),
(2) Date: Jun. 24, 2022

(87) PCT Pub. No.: WO2021/131024
PCT Pub. Date: Jul. 1, 2021

(65) Prior Publication Data
US 2022/0358766 A1    Nov. 10, 2022

(51) Int. Cl.
*G06V 20/52* (2022.01)
*G06V 40/20* (2022.01)
*H04N 7/08* (2006.01)
*G06V 40/16* (2022.01)
*H04N 7/18* (2006.01)
*H04R 1/08* (2006.01)
*G10L 17/06* (2013.01)

(52) U.S. Cl.
CPC ............ *G06V 20/52* (2022.01); *G06V 40/174* (2022.01); *G06V 40/20* (2022.01); *H04N 7/183* (2013.01); *H04R 1/08* (2013.01); *G10L 17/06* (2013.01)

(58) Field of Classification Search
CPC ...... G06V 20/52; G06V 40/174; G06V 40/20; H04N 7/183; H04R 1/08
See application file for complete search history.

(56) References Cited

U.S. PATENT DOCUMENTS 9,682,622 B2 * 6/2017 Kim ..................... G08B 21/06

FOREIGN PATENT DOCUMENTS

JP    H09-035133 A    2/1997
JP    2007-072541 A    3/2007
(Continued)

OTHER PUBLICATIONS

IN Office Action for IN Application No. 202217036156, dated Dec. 13, 2022.
(Continued)

*Primary Examiner* — Rowina J Cattungal
(74) *Attorney, Agent, or Firm* — Sughrue Mion, PLLC (57) ABSTRACT

The present invention provides a processing apparatus (10) including: a detection unit (11) that detects that a notification apparatus is operated; an acquisition unit (12) that acquires, when it is detected that the notification apparatus is operated, at least one of an image generated by a camera and a sound collected by a microphone; a decision unit (13) that decides whether at least one of the image and the sound satisfies a notification condition; and an output unit (14) that outputs, when it is decided that the notification condition is satisfied, notification information indicating that the notification apparatus is operated.

9 Claims, 9 Drawing Sheets

(56) References Cited

FOREIGN PATENT DOCUMENTS

| | | | | |
|---|---|---|---|---|
| JP | 2007-251697 A | | | 9/2007 |
| JP | 2007251697 A | * | | 9/2007 |
| JP | 2011-073819 A | | | 4/2011 |
| JP | 2011073819 A | * | | 4/2011 |
| JP | 2021-051680 A | | | 4/2021 |

OTHER PUBLICATIONS

International Search Report for PCT Application No. PCT/JP2019/051452, dated Feb. 4, 2020.
JP Office Action for JP Application No. 2021-566728, dated Jul. 4, 2023 with English Translation.

* cited by examiner

NOTIFICATION DEVICE, NOTIFICATION METHOD, AND NOTIFICATION STORAGE MEDIUM

This application is a National Stage Entry of PCT/JP2019/051452 filed on Dec. 27, 2019, the contents of all of which are incorporated herein by reference, in their entirety.

TECHNICAL FIELD

The present invention relates to a processing apparatus, a processing method, and a program.

BACKGROUND ART

A notification apparatus that notifies the police that a button is pressed when the button is pressed may be installed on a road, a street, and the like.

Patent Document 1 discloses a self-standing crime prevention light that allows communication with the police via an intercom by being pressed by a person who notifies the police when a state of emergency such as an incident and an accident occurs. Further, Patent Document 1 discloses that a message of a sound is transmitted to a person located around the crime prevention light in order to prevent a notification apparatus from being pressed due to mischief or an erroneous operation.

RELATED DOCUMENT

Patent Document

[Patent Document 1] Japanese Patent Application Publication No. 2007-72541

DISCLOSURE OF THE INVENTION

Technical Problem

A technique disclosed in Patent Document 1 only gives, by a sound, a warning related to mischief or an erroneous operation. When the notification apparatus is pressed due to mischief or an erroneous operation, communication processing with the police is performed. Handling a notification due to mischief or an erroneous operation is a great burden on a person (the police) who handles the notification.

The present invention has a challenge to reduce a frequency of a notification due to mischief or an erroneous operation.

Solution to Problem

The present invention provides a processing apparatus including:
- a detection means for detecting that a notification apparatus is operated;
- an acquisition means for acquiring, when it is detected that the notification apparatus is operated, at least one of an image generated by a camera and a sound collected by a microphone;
- a decision means for deciding whether at least one of the image and the sound satisfies a notification condition; and
- an output means for outputting, when it is decided that the notification condition is satisfied, notification information indicating that the notification apparatus is operated.

Further, the present invention provides a processing method including:
by a computer,
- detecting that a notification apparatus is operated;
- acquiring, when it is detected that the notification apparatus is operated, at least one of an image generated by a camera and a sound collected by a microphone;
- deciding whether at least one of the image and the sound satisfies a notification condition; and
- outputting, when it is decided that the notification condition is satisfied, notification information indicating that the notification apparatus is operated.

Further, the present invention provides a program causing a computer to function as:
- a detection means for detecting that a notification apparatus is operated;
- an acquisition means for acquiring, when it is detected that the notification apparatus is operated, at least one of an image generated by a camera and a sound collected by a microphone;
- a decision means for deciding whether at least one of the image and the sound satisfies a notification condition; and
- an output means for outputting, when it is decided that the notification condition is satisfied, notification information indicating that the notification apparatus is operated.

Advantageous Effects of Invention

The present invention reduces a frequency of a notification due to mischief or an erroneous operation.

BRIEF DESCRIPTION OF THE DRAWINGS

The above-described object, the other objects, features, and advantages will become more apparent from suitable example embodiment described below and the following accompanying drawings.

DESCRIPTION OF EMBODIMENTS

First Example Embodiment

Figure 1:
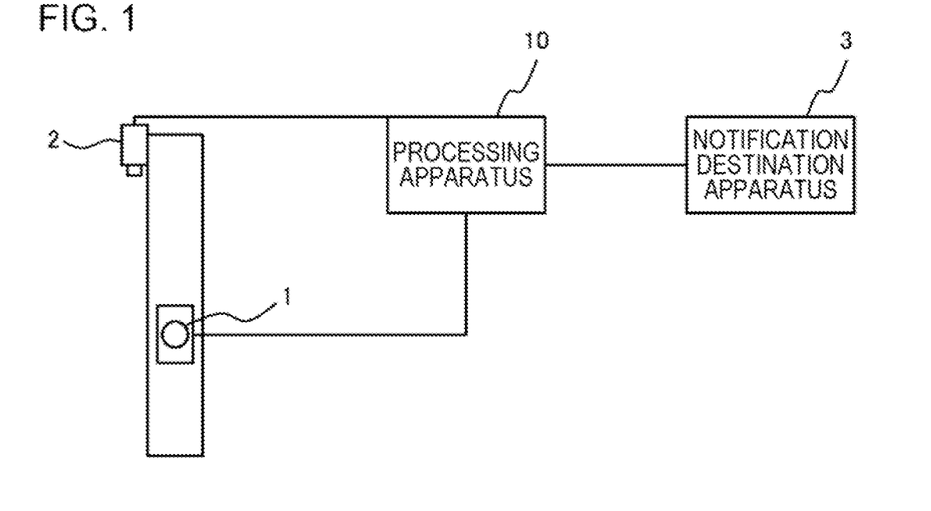
FIG. 1 is a diagram for describing an outline of a processing apparatus according to the present example embodiment.

First, an outline of a processing apparatus 10 according to the present example embodiment will be described by using FIG. 1. As illustrated, a notification apparatus 1 is installed in any position on a road, on a street, at a public facility, and the like. Then, a data collection apparatus 2 including at least one of a camera and a microphone is installed around the notification apparatus 1. The camera is installed in such a way as to capture surroundings of the notification apparatus 1. The microphone is installed in such a way as to collect a sound around the notification apparatus 1. The notification apparatus 1 and the processing apparatus 10 are communicably connected to each other in a wired and/or wireless manner. Further, the data collection apparatus 2 and the processing apparatus 10 are communicably connected to each other in a wired and/or wireless manner.

When the processing apparatus 10 detects that the notification apparatus 1 is operated, based on a signal from the notification apparatus 1, the processing apparatus 10 decides whether data (at least one piece of image data and sound data) generated by the data collection apparatus 2 satisfy a predetermined notification condition. Then, when the processing apparatus 10 decides that the notification condition is satisfied, the processing apparatus 10 transmits, to a notification destination apparatus 3, notification information indicating that the notification apparatus 1 is operated. The notification destination apparatus 3 and the processing apparatus 10 are communicably connected to each other in a wired and/or wireless manner. The notification destination apparatus 3 may be, for example, an apparatus of the police, an apparatus of a security company, or an apparatus managed by another person.

In this way, when the notification apparatus 1 is operated, the processing apparatus 10 can decide whether a notification is necessary, i.e., whether the operation is caused by mischief or an erroneous operation, and the like, based on data generated by the data collection apparatus 2, and can make a notification when the processing apparatus 10 decides that the notification is necessary. Such a processing apparatus 10 reduces a frequency of a notification due to mischief or an erroneous operation.

Next, a configuration of the processing apparatus 10 will be described in detail. First, one example of a hardware configuration of the processing apparatus 10 will be described.

Each functional unit of the processing apparatus 10 is achieved by any combination of hardware and software concentrating on as a central processing unit (CPU) of any computer, a memory, a program loaded into the memory, a storage unit such as a hard disc that stores the program (that can also store a program downloaded from a storage medium such as a compact disc (CD), a server on the Internet, and the like in addition to a program previously stored at a stage of shipping of an apparatus), and a network connection interface. Then, various modification examples of an achievement method and an apparatus thereof are understood by a person skilled in the art.

Figure 2:
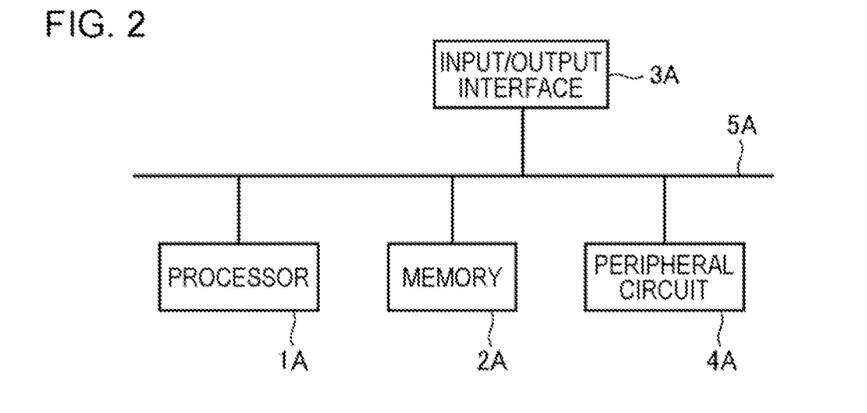
FIG. 2 is a diagram illustrating one example of a hardware configuration of the processing apparatus according to the present example embodiment.

FIG. 2 is a block diagram illustrating the hardware configuration of the processing apparatus 10. As illustrated in FIG. 2, the processing apparatus 10 includes a processor 1A, a memory 2A, an input/output interface 3A, a peripheral circuit 4A, and a bus 5A. Various modules are included in the peripheral circuit 4A. The processing apparatus 10 may not include the peripheral circuit 4A. Note that, the processing apparatus 10 may be formed of a plurality of apparatuses separated physically and/or logically, or may be formed of one apparatus integrated physically and/or logically. When the processing apparatus 10 is formed of a plurality of apparatuses separated physically and/or logically, each of the plurality of apparatuses can include the hardware configuration described above.

The bus 5A is a data transmission path for the processor 1A, the memory 2A, the peripheral circuit 4A, and the input/output interface 3A to transmit and receive data to and from one another. The processor 1A is an arithmetic processing apparatus such as a CPU and a graphics processing unit (GPU), for example. The memory 2A is a memory such as a random access memory (RAM) and a read only memory (ROM), for example. The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can output an instruction to each of modules, and perform an arithmetic operation, based on an arithmetic result of the modules.

Figure 3:
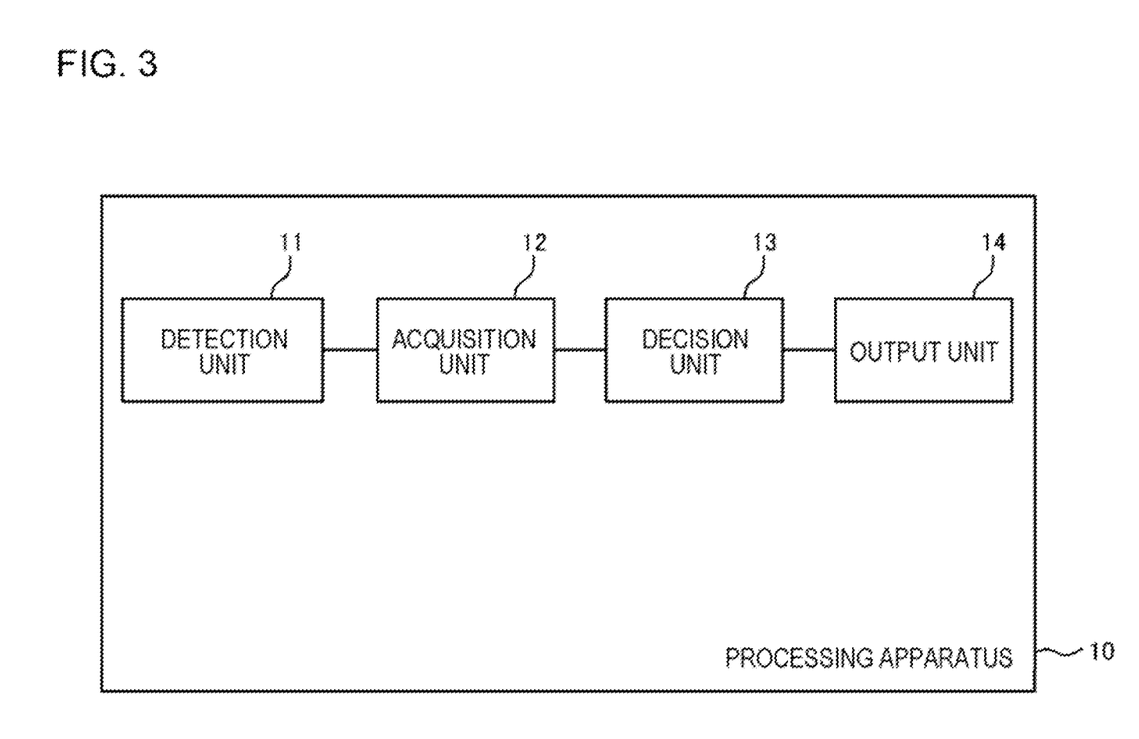
FIG. 3 is one example of a functional block diagram of the processing apparatus according to the present example embodiment.

FIG. 3 is one example of a functional block diagram of the processing apparatus 10. As illustrated, the processing apparatus 10 includes a detection unit 11, an acquisition unit 12, a decision unit 13, and an output unit 14.

The detection unit 11 detects that the notification apparatus 1 is operated. The notification apparatus 1 is installed in any position on a road, on a street, at a public facility, and the like. When the notification apparatus 1 is operated in case of emergency, the police and the like are notified of this operation. For example, the notification apparatus 1 may include a button. Then, an operation performed in case of emergency may be a press of the button. In addition, the notification apparatus 1 may include another input apparatus such as a touch panel, a mouse, and a keyboard. Then, an operation performed in case of emergency may be a predetermined input operation via the input apparatus. However, an operation performed in case of emergency is preferably simple and easy such as a press of a button.

When the notification apparatus 1 receives a predetermined operation (for example: a press of a button, and the like), the notification apparatus 1 transmits, to the processing apparatus 10, a fact that the predetermined operation is received. The detection unit 11 detects that the notification apparatus 1 is operated, based on a signal received from the notification apparatus 1.

Note that, the notification apparatus 1 and the processing apparatus 10 may have a multiple-to-one relationship, or may have a one-to-one relationship.

When it is detected that the notification apparatus 1 is operated, the acquisition unit 12 acquires data generated by the data collection apparatus 2. The data collection apparatus 2 includes at least one of a camera and a microphone. The data generated by such a data collection apparatus 2 include at least one of an image and a sound.

The camera is installed in such a way as to capture surroundings of the notification apparatus 1. For example, the camera is installed in a position and an orientation in such a way as to be able to capture a person who operates the notification apparatus 1, a person located around the person who operates the notification apparatus 1, and the like. The microphone is installed in such a way as to collect a sound around the notification apparatus 1. For example, the microphone is installed in a position and an orientation in such a way as to be able to collect a statement content of a person who operates the notification apparatus 1, a statement content of a person located around the person who operates the notification apparatus 1, a sound generated by a behavior and the like of the person, and the like.

The data generated by the data collection apparatus 2 are accumulated in at least one of a storage apparatus in the data collection apparatus 2, a storage apparatus in the processing apparatus 10, and a storage apparatus in another apparatus configured to be communicable with the data collection apparatus 2. Then, when it is detected that the notification apparatus 1 is operated, the acquisition unit 12 acquires a predetermined part of data from the data accumulated as described above.

For example, the acquisition unit 12 acquires data generated by the data collection apparatus 2 between a start timing before an operation timing at which the notification apparatus 1 is operated and an end timing after the operation timing. In other words, the acquisition unit 12 acquires data before and after the operation timing. The start timing is t1 second before the operation timing. The end timing is t2 second after the operation timing. Note that, t1 and t2 may be the same value or may be different values.

In addition, the acquisition unit 12 may acquire data generated by the data collection apparatus 2 between an operation timing at which the notification apparatus 1 is operated and an end timing after the operation timing. In other words, the acquisition unit 12 may acquire data after the operation timing. The end timing is t2 second after the operation timing.

In addition, the acquisition unit 12 may acquire data generated by the data collection apparatus 2 between a start timing before an operation timing at which the notification apparatus 1 is operated and the operation timing. In other words, the acquisition unit 12 may acquire data before the operation timing. The start timing is t1 second before the operation timing.

Note that, in the present specification, "acquisition" may include "acquisition of data stored in another apparatus or a storage medium by its own apparatus (active acquisition)", based on a user input or an instruction of a program, such as reception by making a request or an inquiry to another apparatus, and reading by accessing to another apparatus or a storage medium, for example. Further, "acquisition" may include "inputting of data output from another apparatus to its own apparatus (passive acquisition)", based on a user input or an instruction of a program, such as reception of data to be distributed (or transmitted, push-notified, or the like), for example. Further, "acquisition" may include acquisition by selection from among pieces of received data or pieces of received information, and "generation of new data by editing data (such as texting, sorting of data, extraction of a part of data, and change of a file format) and the like, and acquisition of the new data".

The decision unit 13 decides whether data (at least one of an image and a sound) acquired by the acquisition unit 12 satisfy a notification condition.

First, one example of processing of deciding whether a notification condition is satisfied, based on an image, will be described. First, the decision unit 13 extracts, as an analysis target, at least one of a person who operates the notification apparatus 1 and a person located around the person who operates the notification apparatus 1 from an image acquired by the acquisition unit 12. For example, the decision unit 13 may extract, as a person who operates the notification apparatus 1, a person who comes into contact with the notification apparatus 1 (a person who touches the notification apparatus 1 with a hand, or the like) at a timing at which the notification apparatus 1 is operated. Then, the decision unit 13 may extract, as a person located around the person who operates the notification apparatus 1, a "person located within a predetermined distance from the person who operates the notification apparatus 1", "another person located within a predetermined distance from the notification apparatus 1", or "another person in an image". "Another person" is a person other than the person who operates the notification apparatus 1. Since a means for extracting a person from an image and a means for estimating an actual distance between two points in an image are widely known, description herein will be omitted.

Then, the decision unit 13 decides whether a notification condition is satisfied, based on at least one of a behavior and an expression of the person extracted as the analysis target. In the present example embodiment, the decision unit 13 decides that the notification condition is satisfied when at least one of a behavior and an expression of the person extracted as the analysis target corresponds to a behavior and an expression that are predefined and require a notification.

For example, as the behavior that requires a notification of a person who operates the notification apparatus 1, "being concerned about a surrounding scene", "being restless", and the like are exemplified. For detection of a behavior of being concerned about a surrounding scene, detection may be performed based on a movement of a face, for example. As one example, when an orientation of a face keeps changing to up, down, left, and right without remaining at rest for a predetermined period of time or longer, it may be decided that a person is concerned about a surrounding scene. Further, for detection of a behavior of being restless, detection may be performed based on a movement of a body, for example. As one example, when a part of a body keeps moving without remaining at rest for a predetermined period of time or longer, and a speed of the change (being computed based on a movement distance of the moving portion within a predetermined period of time, or the like) is equal to or more than a reference level, it may be decided that a person is restless.

Further, an expression that requires a notification of a person who operates the notification apparatus 1 is fear and the like.

Further, a behavior and an expression that require a notification of a person located around a person who operates the notification apparatus 1 may be the same as a behavior and an expression that require a notification of the person who operates the notification apparatus 1. This is assumed based on a situation where the person located around the person who operates the notification apparatus 1 is a friend of the person who operates the notification apparatus 1 and is caught up in some trouble similarly to the person who operates the notification apparatus 1.

Note that, there is a possibility that a person located around a person who operates the notification apparatus 1 may harm the person who operates the notification apparatus 1. Thus, a behavior and an expression that require a notification of a person located around a person who operates the notification apparatus 1 may be a behavior and an expression that tend to be exhibited by such a person.

For example, as a behavior that requires a notification of a person located around a person who operates the notification apparatus 1, "staring a person who operates the notification apparatus 1 without averting eyes", "hitting or kicking a surrounding object", "speaking out something with a mouth wide open and intimidating", and the like are exemplified. For detection of a behavior of staring a person who operates the notification apparatus 1 without averting eyes, detection may be performed based on a movement of a face, for example. As one example, when an orientation of a face keeps facing a person who operates the notification apparatus 1 for a predetermined period of time or longer, it may be decided that a person stares the person who operates the notification apparatus 1 without averting eyes. Further, a behavior of hitting or kicking a surrounding object may be detected based on a movement of a body, for example. As one example, when a part (arm or leg) of a body is moving and coming into contact with a surrounding object, and a speed of the part of the body (being computed based on a movement distance of the moving portion within a predetermined period of time, or the like) is equal to or more than a reference level, it may be decided that a person is hitting or kicking the surrounding object. For detection of a behavior of speaking out something with a mouth wide open and intimidating, detection may be performed based on an orientation of a face and a movement of a mouth, for example. As one example, when a mouth is moving with a face facing a person who operates the notification apparatus 1, and there is a moment of the mouth opening at a reference level or greater during the movement, it may be decided that a person is speaking out something with the mouth wide open and intimidating.

Further, an expression that requires a notification of a person located around a person who operates the notification apparatus 1 is anger and the like.

Note that, the behavior that requires a notification and the method of detecting the behavior described above are merely one example, which are not limited thereto. Further, a means for determining an expression by an image analysis is widely known, description herein will be omitted.

As another example, when a person located around a person who operates the notification apparatus 1 is on a blacklist of dangerous persons being prepared in advance, the decision unit 13 may decide that a notification condition is satisfied. A feature value of an appearance (such as a feature value of a face) of a dangerous person may be registered onto the blacklist. Then, the decision unit 13 may decide whether a person located around a person who operates the notification apparatus 1 is a person on the blacklist, based on the feature value.

Next, one example of processing of deciding whether a notification condition is satisfied, based on a sound, will be described. When a sound that is predefined and requires a notification is included in a sound, the decision unit 13 decides that a notification condition is satisfied. The sound that requires a notification may be a scream, a yell, and the like, or may be a predetermined statement content. The predetermined statement content may be a statement content that is likely to be made by a victim side, such as "stop" and "forgive me", or may be a statement content that is likely to be made by a perpetrator side, such as "wait" and "I don't forgive you". Since a means for detecting a scream, a yell, and the like from a sound and a means for determining a statement content included in a sound are widely known, description herein will be omitted.

In addition, the sound that requires a notification may be a voice of a person on a blacklist of dangerous persons being prepared in advance. In other words, when a voice of a person on a blacklist of dangerous persons is included in a sound, the decision unit 13 may decide that the notification condition is satisfied. A voiceprint of a voice of a dangerous person may be registered onto the blacklist. Then, the decision unit 13 may decide whether a voice of a person on the blacklist is included in a sound, based on the voiceprint.

When it is decided that the notification condition is satisfied, the output unit 14 outputs notification information indicating that the notification apparatus 1 is operated. Specifically, the output unit 14 transmits notification information to the predetermined notification destination apparatus 3. The notification destination apparatus 3 may be, for example, an apparatus of the police, an apparatus of a security company, or an apparatus managed by another person. Note that, the output unit 14 may include, in notification information, data (at least one of an image and a sound) acquired by the acquisition unit 12, information indicating an installation position of the operated notification apparatus 1, and the like.

Next, one example of a flow of processing of the processing apparatus 10 will be described by using flowcharts in FIGS. 4 to 7.

Figure 4:
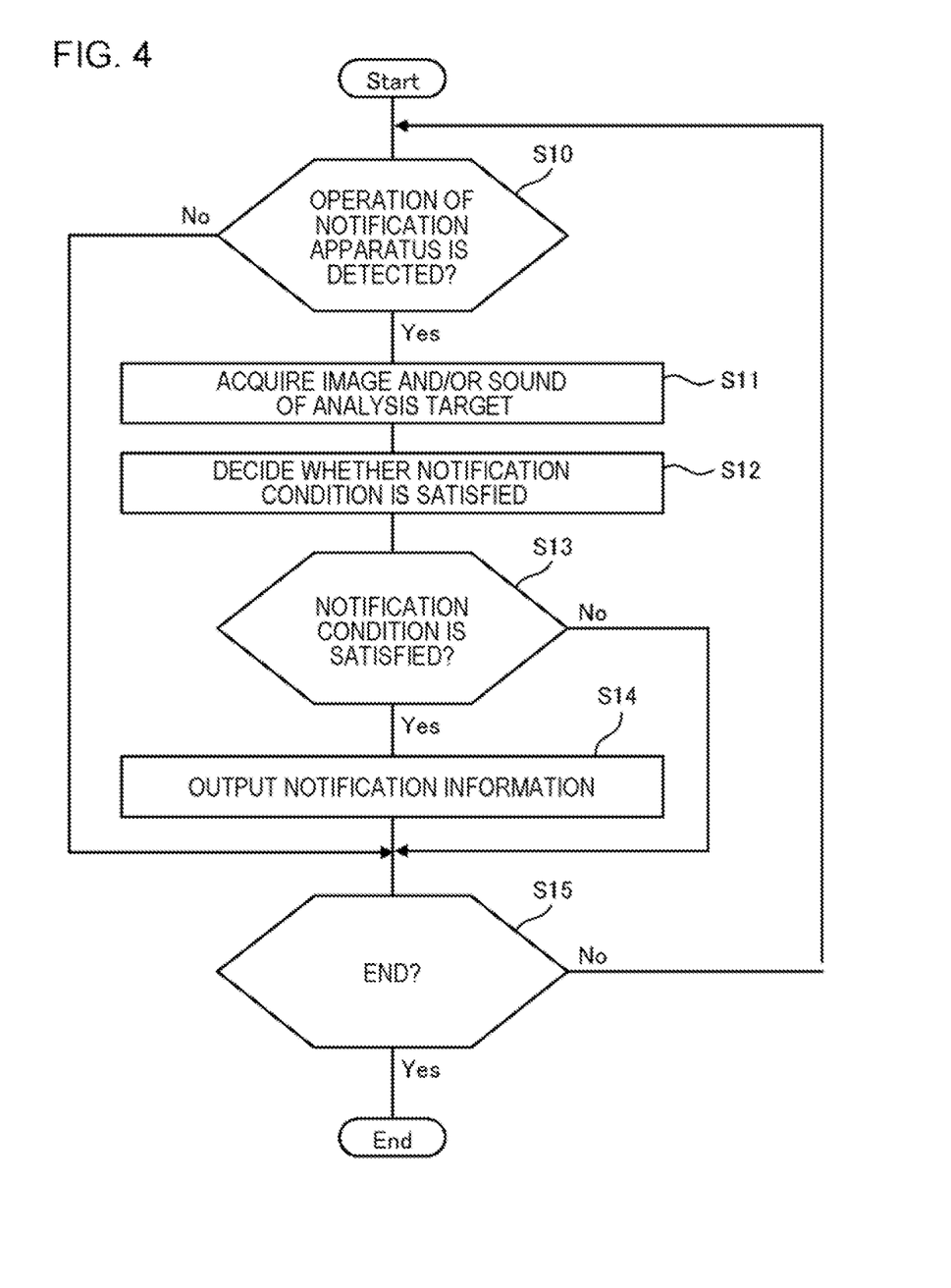
FIG. 4 is a flowchart illustrating one example of a flow of processing of the processing apparatus according to the present example embodiment.

The flowchart in FIG. 4 illustrates the entire flow from detection of an operation of the notification apparatus 1 to an output of notification information.

When the detection unit 11 detects that the notification apparatus 1 is operated, based on a signal from the notification apparatus 1 (Yes in S10), the acquisition unit 12 acquires data (at least one of an image and a sound) generated by the data collection apparatus 2 (S11). For example, the acquisition unit 12 acquires data generated by the data collection apparatus 2 between a start timing before an operation timing at which the notification apparatus 1 is operated and an end timing after the operation timing, i.e., acquires data before and after the operation timing.

Subsequently, the decision unit 13 decides whether the data acquired by the acquisition unit 12 in S11 satisfy a predetermined notification condition (S12). Then, when it is decided that the notification condition is satisfied (Yes in S13), the output unit 14 transmits, to the notification destination apparatus 3, notification information indicating that the notification apparatus 1 is operated (S14). On the other hand, when it is not decided that the notification condition is satisfied (No in S13), the output unit 14 does not transmit the notification information to the notification destination apparatus 3. The output unit 14 may include, in the notification information, data (at least one of an image and a sound) acquired by the acquisition unit 12, information indicating an installation position of the operated notification apparatus 1, and the like.

Note that, although not illustrated, the notification destination apparatus 3 that receives the notification information may transmit, to a terminal of a person (such as a police officer and a security guard) located near the operated notification apparatus 1, information indicating the operated notification apparatus 1 and a request to rush to the operated notification apparatus 1. Note that, at least one of an image in which surroundings of the operated notification apparatus 1 are captured and a sound collected around the operated notification apparatus 1 may be included in the request. Then, the notification destination apparatus 3 may receive, from the terminal, a reply to whether the person can rush to the operated notification apparatus 1. In this case, the notification destination apparatus 3 can manage, in advance, positional information about a terminal of each of a plurality of persons (such as police officers and security guards), and determine a person located near the operated notification apparatus 1, based on the management information.

Figure 5:
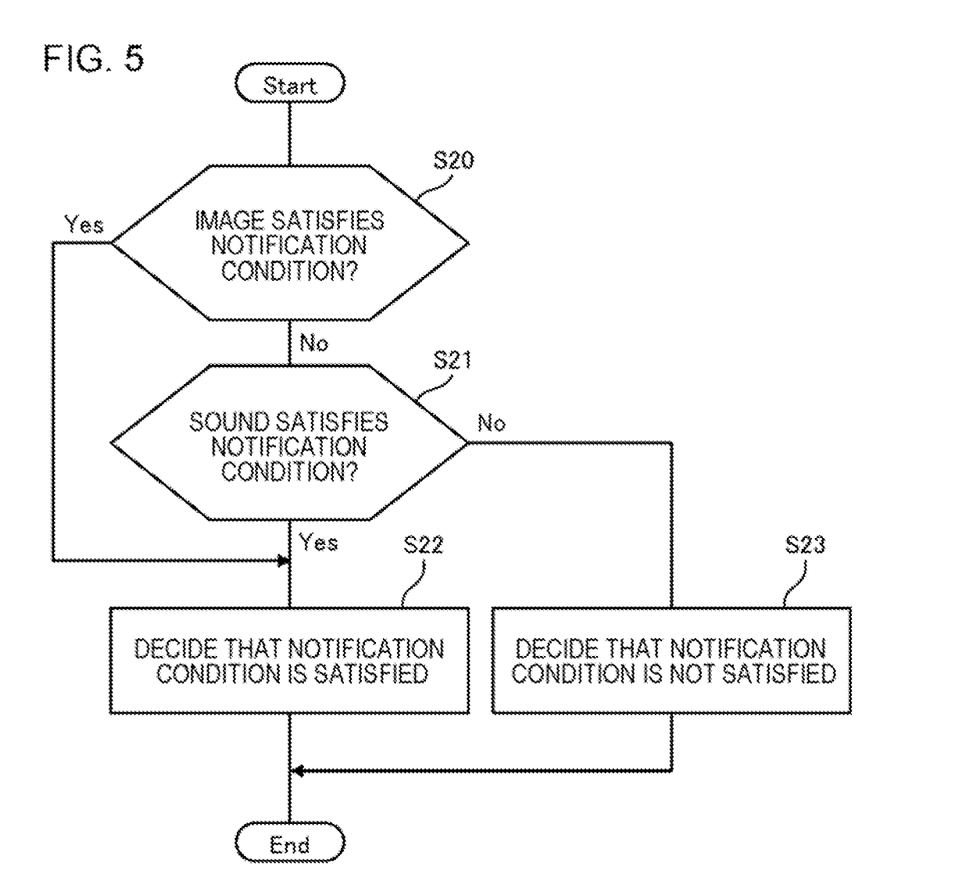
FIG. 5 is a flowchart illustrating one example of a flow of processing of the processing apparatus according to the present example embodiment.

FIG. 5 illustrates one example of a flow of the processing in S12 in FIG. 4. In the example, the acquisition unit 12 acquires both of an image and a sound in S11, and the decision unit 13 decides whether a notification condition is satisfied, based on both of the image and the sound.

When an image satisfies the notification condition (Yes in S20), the decision unit 13 decides that the notification condition is satisfied (S22).

Further, when an image does not satisfy the notification condition (No in S20), but a sound satisfies the notification condition (Yes in S21), the decision unit 13 decides that the notification condition is satisfied (S22).

Then, when an image does not satisfy the notification condition (No in S20), and a sound also does not satisfy the notification condition (No in S21), the decision unit 13 decides that the notification condition is not satisfied (S23).

Figure 6:
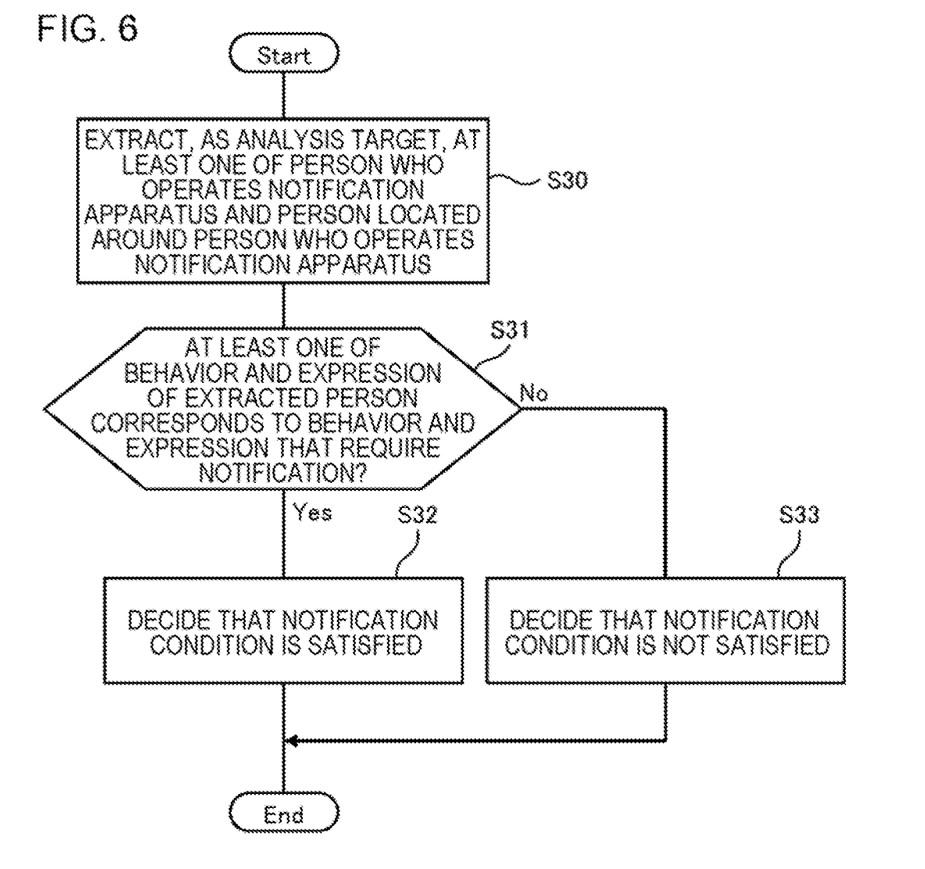
FIG. 6 is a flowchart illustrating one example of a flow of processing of the processing apparatus according to the present example embodiment.

FIG. 6 illustrates one example of a flow of processing of deciding whether a notification condition is satisfied, based on an image. In the example, the decision unit 13 decides whether the notification condition is satisfied, based on both of a behavior and an expression of a person as an analysis target.

The decision unit 13 extracts, as an analysis target, at least one of a person who operates the notification apparatus 1 and a person located around the person who operates the notification apparatus 1 from an image (S30). When at least one of a behavior and an expression of the person as the analysis target corresponds to a behavior and an expression that are predefined and require a notification (Yes in S31), the decision unit 13 decides that the notification condition is satisfied (S32). On the other hand, when none of the behavior and the expression of the person as the analysis target corresponds to a behavior and an expression that are predefined and require a notification (No in S31), the decision unit 13 decides that the notification condition is not satisfied (S33).

Figure 7:
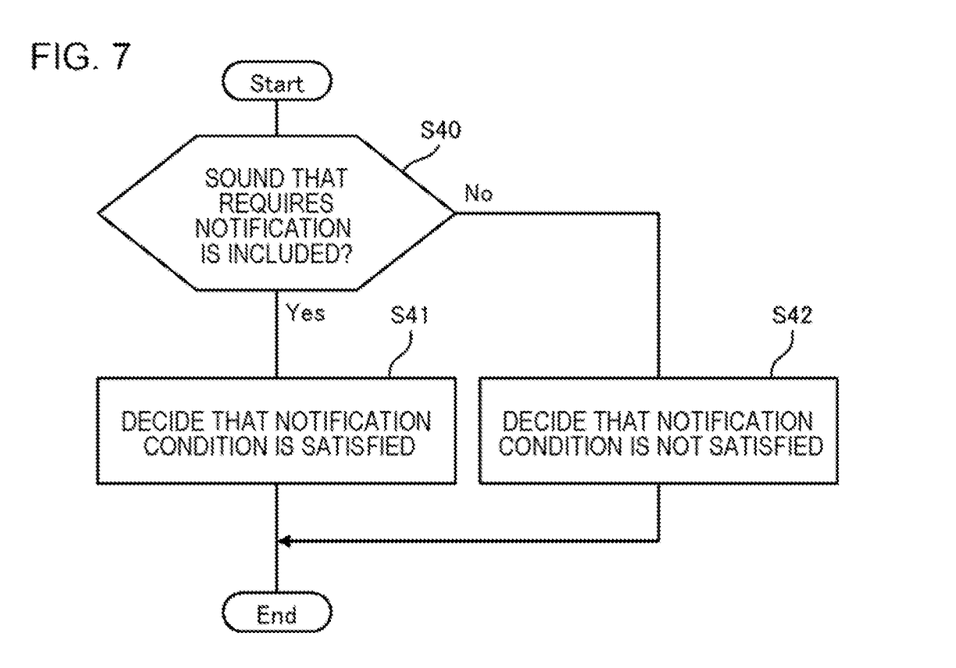
FIG. 7 is a flowchart illustrating one example of a flow of processing of the processing apparatus according to the present example embodiment.

FIG. 7 illustrates one example of a flow of processing of deciding whether a notification condition is satisfied, based on a sound. When a sound that is predefined and requires a notification is included in a sound (Yes in S40), the decision unit 13 decides that a notification condition is satisfied (S41). On the other hand, when a sound that is predefined and requires a notification is not included in a sound (No in S40), it is decided that the notification condition is not satisfied (S42).

When the notification apparatus 1 is operated, the processing apparatus 10 according to the present example embodiment described above can decide whether a notification is necessary, i.e., whether the operation is caused by mischief or an erroneous operation, and the like, based on data generated by the data collection apparatus 2, and can make a notification when the processing apparatus 10 decides that the notification is necessary. Such a processing apparatus 10 reduces a frequency of a notification due to mischief or an erroneous operation.

Further, the processing apparatus 10 can decide whether there is mischief or an erroneous operation, based on a behavior, an expression, and the like of at least one of a person who operates the notification apparatus 1 and a person located around the person who operates the notification apparatus 1. Specifically, the processing apparatus 10 can decide whether there is mischief or an erroneous operation, based on whether a behavior and an expression of the persons require a notification. Such a processing apparatus 10 can detect mischief or an erroneous operation with high accuracy.

Further, the processing apparatus 10 can decide whether there is mischief or an erroneous operation, based on a statement content of at least one of a person who operates the notification apparatus 1 and a person located around the person who operates the notification apparatus 1, a sound generated by action of the persons, and the like. Specifically, the processing apparatus 10 can decide whether there is mischief or an erroneous operation, based on whether a sound that requires a notification is included in a sound. Such a processing apparatus 10 can detect mischief or an erroneous operation with high accuracy.

Further, the processing apparatus 10 can decide whether there is mischief or an erroneous operation, based on not only an image and a sound after an operation timing at which the notification apparatus 1 is operated, but also an image and a sound before the operation timing. Such a processing apparatus 10 can detect mischief or an erroneous operation with high accuracy.

Second Example Embodiment

A decision unit 13 according to the present example embodiment decides whether a notification condition is satisfied, based on whether at least one of a behavior and an expression of a person extracted as an analysis target corresponds to a behavior and an expression that are predefined and do not require a notification. The decision unit 13 decides that the notification condition is not satisfied when at least one of the behavior and the expression of the person extracted as the analysis target corresponds to the behavior and the expression that do not require a notification.

For example, as the behavior that does not require a notification of a person who operates a notification apparatus 1, "laughing", "smiling", "yawning", "not being concerned about a surrounding scene", "being calm", and the like are exemplified.

Further, an expression that does not require a notification of a person who operates the notification apparatus 1 is a smile, joy, peace, calmness, and the like.

Further, a behavior and an expression that do not require a notification of a person located around a person who operates the notification apparatus 1 are the same as a behavior and an expression that do not require a notification of the person who operates the notification apparatus 1. This is assumed based on a situation where the person located around the person who operates the notification apparatus 1 is a friend of the person who operates the notification apparatus 1 and does mischief and the like together with the person who operates the notification apparatus 1.

As another example, when either a person who operates the notification apparatus 1 or a person located around the person who operates the notification apparatus 1 is on a blacklist of habitual criminals being prepared in advance, the decision unit 13 may decide that the notification condition is not satisfied. A feature value of an appearance (such as a feature value of a face) of a mischief habitual criminal may be registered onto the blacklist. Then, the decision unit 13 may decide whether a person who operates the notification apparatus 1 and a person located around the person who operates the notification apparatus 1 is a person on the blacklist, based on the feature value.

Further, when a sound that is predefined and does not require a notification is included in a sound, the decision unit 13 can decide that the notification condition is not satisfied. The sound that does not require a notification may be laughter and the like, or may be a predetermined statement content. The predetermined statement content may be a statement content that is likely to be made by a person doing mischief, such as "don't do it", "keep me out of it", and "do it quickly", or may be a statement content that is likely to be made by a person who performs an erroneous operation, such as "I made a mistake", "oops", and "what have I done?".

In addition, the sound that does not require a notification may be a voice of a person on a blacklist of mischief habitual criminals being prepared in advance. In other words, when a voice of a person on the blacklist of mischief habitual criminals is included in a sound, the decision unit 13 may decide that the notification condition is not satisfied. A voiceprint of a voice of a mischief habitual criminal may be registered onto the blacklist. Then, the decision unit 13 may decide whether a voice of a person on the blacklist is included in a sound, based on the voiceprint.

Figure 8:
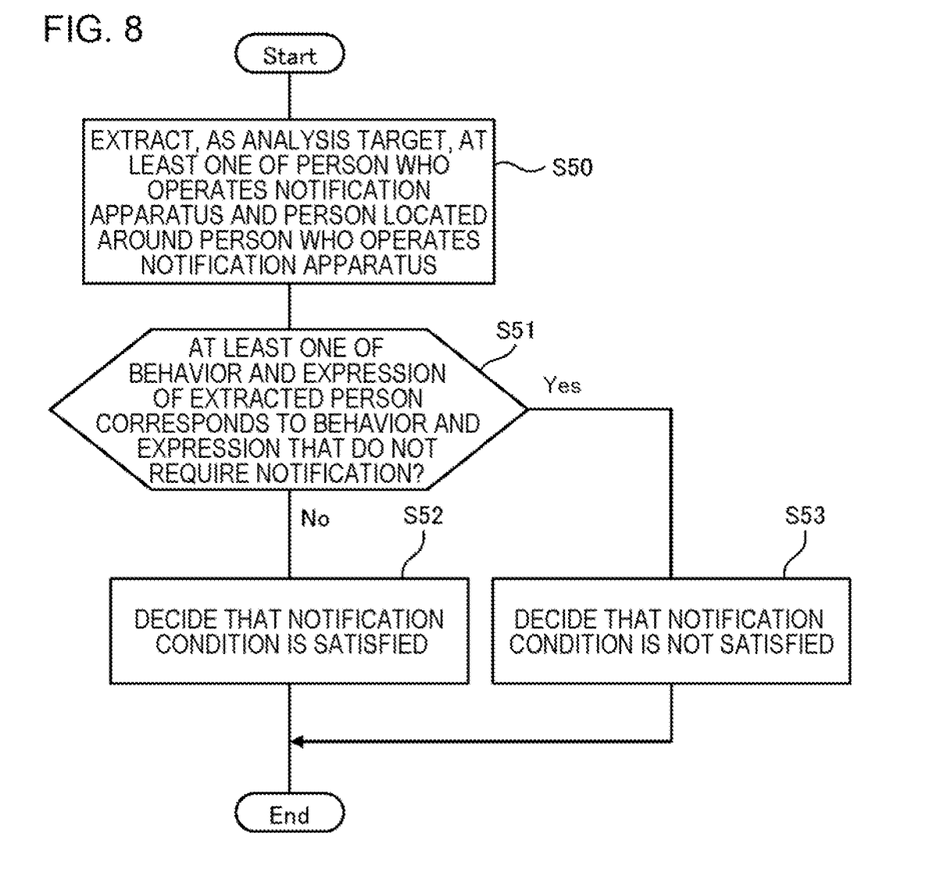
FIG. 8 is a flowchart illustrating one example of a flow of processing of the processing apparatus according to the present example embodiment.

Next, one example of a flow of processing of a processing apparatus 10 will be described. FIG. 8 illustrates one example of a flow of processing of deciding whether a notification condition is satisfied, based on an image. In the example, the decision unit 13 decides whether a notification condition is satisfied, based on both of a behavior and an expression of a person as an analysis target.

The decision unit 13 extracts, as an analysis target, at least one of a person who operates the notification apparatus 1 and a person located around the person who operates the notification apparatus 1 from an image (S50). When at least one of the behavior and the expression of the person as the analysis target corresponds to a behavior and an expression that are predefined and do not require a notification (Yes in S51), the decision unit 13 decides that the notification condition is not satisfied (S53). On the other hand, when none of the behavior and the expression of the person as the analysis target corresponds to the behavior and the expression that are predefined and do not require a notification (No in S51), the decision unit 13 decides that the notification condition is satisfied (S52).

Figure 9:
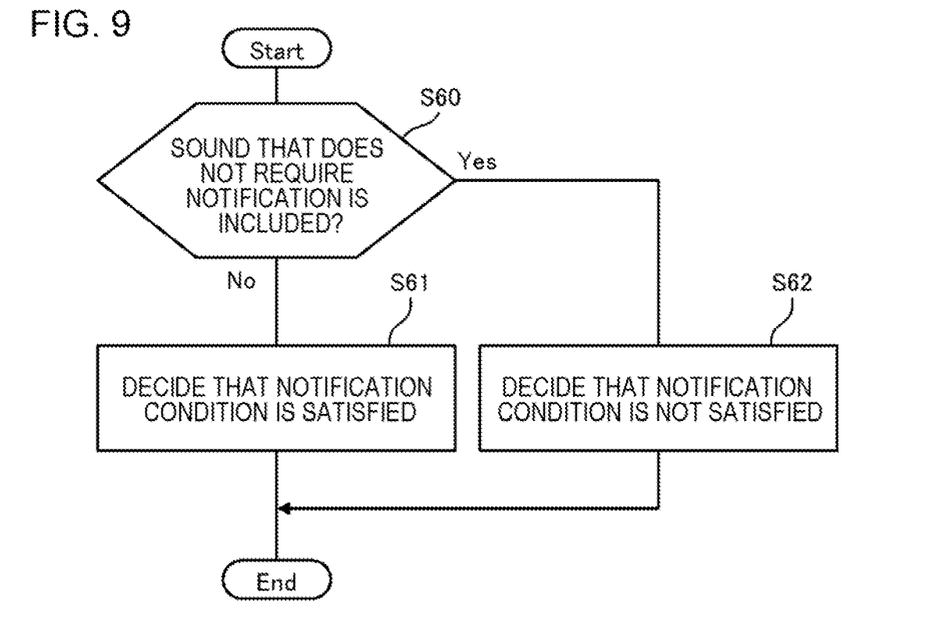
FIG. 9 is a flowchart illustrating one example of a flow of processing of the processing apparatus according to the present example embodiment.

FIG. 9 illustrates one example of a flow of processing of deciding whether a notification condition is satisfied, based on a sound. When a sound that is predefined and does not require a notification is included in a sound (Yes in S60), the decision unit 13 decides that a notification condition is not satisfied (S62). On the other hand, when a sound that is predefined and does not require a notification is not included in a sound (No in S60), it is decided that the notification condition is satisfied (S61).

Another configuration of the processing apparatus 10 is similar to that in the first example embodiment.

The processing apparatus 10 according to the present example embodiment can achieve an advantageous effect similar to that in the first example embodiment. Further, the processing apparatus 10 can decide whether there is mischief or an erroneous operation, based on whether a behavior and an expression of at least one of a person who operates the notification apparatus 1 and a person located around the person who operates the notification apparatus 1 do not require a notification. Such a processing apparatus 10 can detect mischief or an erroneous operation with high accuracy.

Further, the processing apparatus 10 can decide whether there is mischief or an erroneous operation, based on whether a sound that does not require a notification is included in a statement content of at least one of a person who operates the notification apparatus 1 and a person located around the person who operates the notification apparatus 1, and a sound generated by action of the persons. Such a processing apparatus 10 can detect mischief or an erroneous operation with high accuracy.

MODIFICATION EXAMPLE

Herein, modification examples of the processing apparatus 10 applicable to the first and second example embodiments will be described. The processing apparatus 10 according to the first and second example embodiments transmits, to a notification destination apparatus 3, notification information in response to an operation of the notification apparatus 1. As a modification example, the processing apparatus 10 may include a function of transmitting, to the notification destination apparatus 3, notification information without an operation of the notification apparatus 1. Specifically, the processing apparatus 10 may always survey data generated by a data collection apparatus 2, and perform processing of detecting an abnormality. Then, when an abnormality is detected from the data generated by the data collection apparatus 2, the processing apparatus 10 may transmit notification information to the notification destination apparatus 3.

A content detected as an abnormality by the processing apparatus 10 may be, for example, a fact that a person is running toward the notification apparatus 1. This can be detected based on an image. In addition, the processing apparatus 10 may detect, as an abnormality, a scream, a yell, and the like from a sound. In addition, the processing apparatus 10 may detect an act of violence, such as hitting and kicking, based on an image.

For example, there may be a person falling into a situation where the person comes close to the notification apparatus 1 in order to operate the notification apparatus 1, but the person is interrupted and cannot operate the notification apparatus 1. The processing apparatus 10 that can make a notification without an operation of the notification apparatus 1, based on a surrounding scene of the notification apparatus 1, can achieve relief to a person falling into such a situation, and the like.

The invention of the present application is described above with reference to the example embodiments (examples), but the invention of the present application is not limited to the example embodiments (examples) described above. Various modifications that can be understood by those skilled in the art can be made to the configuration and the details of the invention of the present application within the scope of the invention of the present application.

A part or the whole of the above-described example embodiments may also be described as in supplementary notes below, which is not limited thereto.

1. A processing apparatus, including:
    a detection means for detecting that a notification apparatus is operated;
    an acquisition means for acquiring, when it is detected that the notification apparatus is operated, at least one of an image generated by a camera and a sound collected by a microphone;
    a decision means for deciding whether at least one of the image and the sound satisfies a notification condition; and
    an output means for outputting, when it is decided that the notification condition is satisfied, notification information indicating that the notification apparatus is operated.

2. The processing apparatus according to supplementary note 1, wherein
    the acquisition means acquires at least one of an image generated by the camera and a sound collected by the microphone between a start timing before an operation timing at which the notification apparatus is operated and an end timing after the operation timing.

3. The processing apparatus according to supplementary note 1 or 2, wherein
    the camera captures surroundings of the notification apparatus, and the microphone collects a sound around the notification apparatus.

4. The processing apparatus according to any of supplementary notes 1 to 3, wherein
the decision means
extracts, as an analysis target, a person who operates the notification apparatus from the image, and
decides whether the notification condition is satisfied, based on a behavior of a person extracted as the analysis target.
5. The processing apparatus according to any of supplementary notes 1 to 4, wherein
the decision means
extracts, as an analysis target, a person who operates the notification apparatus and a person located around the person who operates the notification apparatus from the image, and
decides whether the notification condition is satisfied, based on at least one of a behavior and an expression of a person extracted as the analysis target.
6. The processing apparatus according to supplementary note 4 or 5, wherein
the decision means decides that the notification condition is satisfied when at least one of a behavior and an expression of a person extracted as the analysis target corresponds to a behavior and an expression that are predefined and require a notification.
7. The processing apparatus according to supplementary note 4 or 5, wherein
the decision means decides that the notification condition is not satisfied when at least one of a behavior and an expression of a person extracted as the analysis target corresponds to a behavior and an expression that are predefined and do not require a notification.
8. The processing apparatus according to any of supplementary notes 1 to 7, wherein
the decision means decides that the notification condition is satisfied when a sound that is predefined and requires a notification is included in the sound.
9. The processing apparatus according to any of supplementary notes 1 to 7, wherein
the decision means decides that the notification condition is not satisfied when a sound that is predefined and does not require a notification is included in the sound.
10. A processing method, including:
by a computer,
detecting that a notification apparatus is operated;
acquiring, when it is detected that the notification apparatus is operated, at least one of an image generated by a camera and a sound collected by a microphone;
deciding whether at least one of the image and the sound satisfies a notification condition; and
outputting, when it is decided that the notification condition is satisfied, notification information indicating that the notification apparatus is operated.
11. A program causing a computer to function as:
a detection means for detecting that a notification apparatus is operated;
an acquisition means for acquiring, when it is detected that the notification apparatus is operated, at least one of an image generated by a camera and a sound collected by a microphone;
a decision means for deciding whether at least one of the image and the sound satisfies a notification condition; and
an output means for outputting, when it is decided that the notification condition is satisfied, notification information indicating that the notification apparatus is operated.

What is claimed is:
1. A processing apparatus, comprising:
at least one memory configured to store one or more instructions; and
at least one processor configured to execute the one or more instructions to:
detect that a notification apparatus is operated;
acquire, when it is detected that the notification apparatus is operated, at least one of an image generated by a camera and a sound collected by a microphone;
decide whether at least one of the image and the sound satisfies a notification condition; and
output, when it is decided that the notification condition is satisfied, notification information indicating that the notification apparatus is operated,
wherein the processor is further configured to execute the one or more instructions to:
extract, as an analysis target, a person who operates the notification apparatus from the image, and
decide whether the notification condition is satisfied, based on a behavior of the person extracted as the analysis target.
2. The processing apparatus according to claim 1, wherein the processor is further configured to execute the one or more instructions to acquire at least one of an image generated by the camera and a sound collected by the microphone between a start timing before an operation timing at which the notification apparatus is operated and an end timing after the operation timing.
3. The processing apparatus according to claim 1, wherein
the camera captures surroundings of the notification apparatus, and the microphone collects a sound around the notification apparatus.
4. The processing apparatus according to claim 1, wherein the processor is further configured to execute the one or more instructions to:
extract, as an analysis target, a person located around a person who operates the notification apparatus from the image, and
decide whether the notification condition is satisfied, based on at least one of a behavior and an expression of a person extracted as the analysis target.
5. The processing apparatus according to claim 1, wherein the processor is further configured to execute the one or more instructions to tom decide that the notification condition is satisfied when at least one of a behavior and an expression of a person extracted as the analysis target corresponds to a behavior and an expression that are predefined and require a notification.
6. The processing apparatus according to claim 1, wherein the processor is further configured to execute the one or more instructions to decide that the notification condition is not satisfied when at least one of a behavior and an expression of a person extracted as the analysis target corresponds to a behavior and an expression that are predefined and do not require a notification.
7. The processing apparatus according to claim 1, wherein the processor is further configured to execute the one or more instructions to decide that the notification condition is satisfied when a sound that is predefined and requires a notification is included in the sound.
8. A processing method, comprising:
by a computer,
detecting that a notification apparatus is operated;
acquiring, when it is detected that the notification apparatus is operated, at least one of an image generated by a camera and a sound collected by a microphone;

deciding whether at least one of the image and the sound satisfies a notification condition; and
outputting, when it is decided that the notification condition is satisfied, notification information indicating that the notification apparatus is operated,
wherein the method further comprises:
extracting, as an analysis target, a person who operates the notification apparatus from the image, and
deciding whether the notification condition is satisfied, based on a behavior of the person extracted as the analysis target.

9. A non-transitory storage medium storing a program causing a computer to:
detect that a notification apparatus is operated;
acquire, when it is detected that the notification apparatus is operated, at least one of an image generated by a camera and a sound collected by a microphone;
decide whether at least one of the image and the sound satisfies a notification condition; and
output, when it is decided that the notification condition is satisfied, notification information indicating that the notification apparatus is operated,
wherein the program further causing the computer to:
extract, as an analysis target, a person who operates the notification apparatus from the image, and
decide whether the notification condition is satisfied, based on a behavior of the person extracted as the analysis target.

* * * * *